United States Patent
Abraham et al.

(10) Patent No.: US 9,758,668 B2
(45) Date of Patent: Sep. 12, 2017

(54) METHOD AND APPARATUS FOR ULTRASOUND TRANSDUCER ARRAYS WITH ACCELERATED CURE ADHESIVES

(71) Applicant: GENERAL ELECTRIC COMPANY, Schenectady, NY (US)

(72) Inventors: Jessica Abraham, Chandler, AZ (US); Jessica Subit, Peoria, AZ (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 252 days.

(21) Appl. No.: 14/790,786

(22) Filed: Jul. 2, 2015

(65) Prior Publication Data

US 2017/0003254 A1   Jan. 5, 2017

(51) Int. Cl.
*G01N 29/24*    (2006.01)
*B32B 37/12*    (2006.01)
*B32B 37/14*    (2006.01)
*C08L 63/00*    (2006.01)
*B06B 1/06*     (2006.01)

(52) U.S. Cl.
CPC ............ *C08L 63/00* (2013.01); *B06B 1/0607* (2013.01); *B32B 37/12* (2013.01); *B32B 2305/72* (2013.01); *B32B 2307/10* (2013.01)

(58) Field of Classification Search
CPC ..... C08L 63/00; B32B 37/12; B32B 2305/72; B32B 2307/10; B06B 1/0607
See application file for complete search history.

(56) References Cited

U.S. PATENT DOCUMENTS

2011/0152394 A1* 6/2011 Pyun ............... C08G 59/621
                                                       521/135
2017/0003254 A1* 1/2017 Abraham ............... C08L 63/00

* cited by examiner

*Primary Examiner* — Daniel Pihulic
(74) *Attorney, Agent, or Firm* — GE Global Patent Operation; Marc A. Vivenzo (57) ABSTRACT

An acoustic stack is described, where the acoustic stack comprises a plurality of acoustic stack components, which are laminated with an accelerated cure adhesive, which comprises an epoxy resin. The epoxy resin comprises one or more modified epoxy resins, which are selected from a group consisting of epoxy phenol novolac, bisphenol A, and bisphenol F. Further described is a method for producing an acoustic stack. The method comprises providing a plurality of acoustic stack components and dispensing an accelerated cure adhesive to the acoustic stack components. The accelerated cure adhesive dispensed on, to, and/or in the acoustic stack components includes an epoxy resin, which comprises at least one modified epoxy resin selected from a group consisting of epoxy phenol novolac, bisphenol A, and bisphenol F. After the accelerated cure adhesive is dispensed to the acoustic stack components, the accelerated cure adhesive is cured.

20 Claims, 5 Drawing Sheets

METHOD AND APPARATUS FOR ULTRASOUND TRANSDUCER ARRAYS WITH ACCELERATED CURE ADHESIVES

BACKGROUND

The subject matter disclosed herein relates generally to transducers, and more particularly to acoustic stacks and methods for manufacturing acoustic stacks.

Ultrasound technology is used in a variety of fields, including the field of medical imaging. Ultrasound scanning within the healthcare field typically involves the use a transducer, which emits high-frequency sound waves from a probe, through a gel on a patient's body, and into a patient's body. The transducer then collects sounds that "bounce back" or echo from a target of interest, where a computer may convert the sound waves into an image.

Ultrasound systems typically include ultrasound scanning devices (e.g., an ultrasound transducer, all or a portion of which may be housed within a probe) that perform various ultrasound scans to produce images of a body or other volume. The scanning devices include acoustic elements or components that transmit and receive ultrasound signals, which may be arranged in an array. Ultrasound transducers convert electrical signals into ultrasonic energy, which may then be converted into electrical signals. The ultrasound signals received by the acoustic elements are used to generate an image of the body or other volume. For example, the received ultrasound signals may be used to generate an image of internal tissues of a patient, such as, but not limited to, an image of a patient's heart, to guide a procedure, such as a biopsy, or to diagnose a variety of conditions, such as tumors or blockage in blood vessels.

A typical ultrasound transducer uses one or more matching layers to couple the acoustic energy produced in a piezoelectric to a patient or other volume. The matching layers may lie above the transducer and in proximity to the patient or volume being examined. Acoustic coupling is achieved layer-by-layer. The relatively high acoustic impedance of a piezoelectric material in a transducer as compared to a body is spanned by intervening impedances of the matching layers. A first matching layer of a first impedance may be used, where the first matching layer is the first layer encountered by the sound path from the transducer to the body. If additional matching layers are used, a progressively lower impedance is used through each successive layer. The topmost layer, therefore has a higher impedance than a body or volume, but where the impedance is lowered using more than one layer, a smoother impedance transition is achieved in acoustically coupling the ultrasound generated at the piezoelectric to the body or volume and in coupling the ultrasound returning from the body to the piezoelectric.

Matching layers are typically stiff enough that the layers for each element of the array must be separated from each other mechanically or through some other means to keep each element acoustically independent of the others. This can be achieved by saw cuts that penetrate the two matching layers and the piezoelectric material.

A matching layer may be comprised of a single row or multiple rows of elements formed from ceramics, graphite composites, polyurethane and other materials. In a 2D transducer, for example, a sound wave oscillates at a certain frequency, and the sound wave and oscillation frequency can be associated with one another. In some 2D transducers, since element impedance is lower, the impedance of the matching layers should also be lower. 2D transducers are currently built with two or more matching layers.

A piezoelectric transducer of an ultrasound probe uses electric fields provided by the piezoelectric. Electrodes then detect the fields produced by the piezoelectric, where the electrodes are attached to at least two faces of the piezoelectric. A voltage is applied between the electrodes requiring electrical connections to be made to the electrodes. Each element of the transducer may receive a different electrical input. Elements may be attached perpendicularly to the sound path or to a common ground on top of or under the array. The matching layer may serve as a ground plane or to a separate ground plane.

At least some known ultrasound systems include electronics that transmit and/or receive beamforming operations on the ultrasound signals. These electronics may include one or more integrated circuits. Such beamforming electronics are electrically and mechanically connected to the acoustic elements of the ultrasound transducer for performing the beamforming operations. The electrical and mechanical connection between the beamforming electronics and the acoustic elements may be a direct connection or may be provided through an interposer that extends between the acoustic elements and the beamforming electronics.

The manufacture of some acoustic sensor arrays, for example ultrasound transducers, require lamination or gluing of net shaped components or electrical components via ohmic contact to achieve certain bond lines, such as between 0 to 3 µm. Subsequently, the pre-diced configurations of an acoustic stack may be diced into high aspect ratio pixels to produce acoustic elements or transducer elements.

Traditional acoustic sensor array processing is costly because of its high cycle time, equipment requirements, equipment costs, and high scrap rates where assemblies or material cannot be used, repaired, or restored, and must be discarded. Currently available adhesives, for example 3M™ Scotch-Weld™ Epoxy Adhesive DP460 (hereinafter, "DP460"), 3M, Maplewood, Minn., USA, or other high viscosity adhesives are a main driver in the acoustic sensor array production costs.

A typical curing cycle may range from 3 to 24 hours at a low temperature for high viscosity adhesives. As a result of the long curing cycle, the current adhesives require the use of specific tooling, fixturing, and equipment designed to precisely align and hold the various components. At the same time, pressure must be applied to the acoustic array components for a long period of time to facilitate the extensive curing times required. These long, low temperature cure cycles allow the traditional aid the cure kinetics and allow the adhesives to flow as heat is applied. These flow profiles can cause portions of the interface to be missed or have too little adhesive leading to starved bondlines, while excess adhesive may be found in other portions. Starved bondlines can produce weakened areas or joints, cause poor adhesion, and result in disbanding of stack layers while excess adhesive results in poor capacitance, open joints, loop gain failures, and sensitivity failures.

SUMMARY

Due to the high cycle time, equipment requirements, equipment costs, and scrap rates, there is a need for an adhesive for the production of acoustic sensor arrays with a shorter cure time, which results in a decrease in the aforementioned failure defects and production costs.

In one embodiment, an acoustic stack is disclosed, where the acoustic stack comprises a plurality of acoustic stack components, which are laminated with an accelerated cure adhesive, which comprises an epoxy resin. The epoxy resin comprises one or more modified epoxy resins, which are selected from a group consisting of epoxy phenol novolac, bisphenol A, and bisphenol F.

In one embodiment, a method for producing an acoustic stack is disclosed, wherein the method comprises providing a plurality of acoustic stack components and dispensing an accelerated cure adhesive to the acoustic stack components. The accelerated cure adhesive dispensed on, to, and/or in the acoustic stack components comprises an epoxy resin, which has at least one modified epoxy resin selected from a group consisting of epoxy phenol novolac, bisphenol A, and bisphenol F. After the accelerated cure adhesive is dispensed to the acoustic stack components, the accelerated cure adhesive is cured.

BRIEF DESCRIPTION OF THE DRAWINGS

Other object feature and advantages of the present invention will become evident from the following description of the embodiments of the invention taken in conjunction with the following drawings, wherein.

DETAILED DESCRIPTION

The subject matter disclosed herein provides accelerated cure adhesives for acoustic stacks and for the manufacturing of an acoustic stack.

Figure 1:
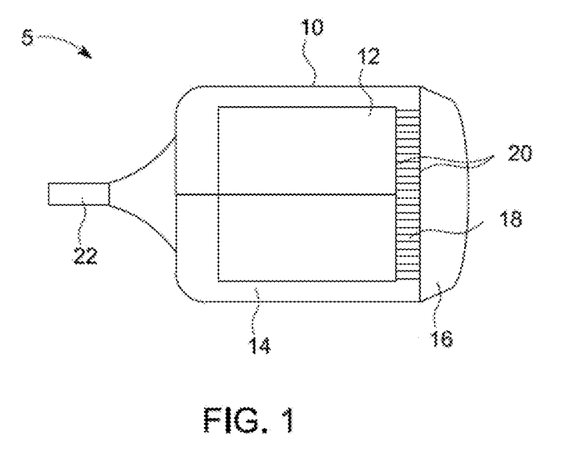
FIG. 1 is a depiction of an exemplary transducer.

Referring to FIG. 1, a depiction of an exemplary ultrasound transducer 5 is shown. A typical ultrasound transducer comprises an outer casing 10, a backing block 12, an acoustic insulator 14, a nose or membrane 16, a piezoelectric crystal 18, and one or more electrodes 20. A typical ultrasound transducer also typically comprises an acoustic stack (not shown) within outer casing 10. The outer casing 10 of the transducer 5 may be comprised of metal. The nose or membrane 16, which may comprise one or more matching layers, and/or may be comprised of plastic or a similar material. The electrode or electrodes 20 may apply an alternating potential difference. The transducer 5 is typically connected to a power cable or coaxial cable 22 to a power source to power the transducer 5.

Figure 2:
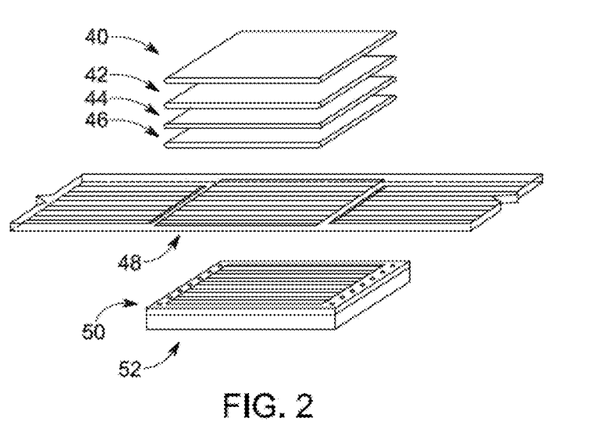
FIG. 2 illustrates an exploded perspective view of an exemplary acoustic stack.

Referring to FIG. 2, an exploded perspective view of an exemplary acoustic stack 15 is shown. The acoustic stack 15 may be used in a transducer similar to transducer 5 shown in FIG. 1. Ultrasound transducers, which may also be referred to as probes, typically have many acoustic stacks arranged in one dimension or two dimensional arrays. Each acoustic stack may correspond to an element within the transducer and a transducer may have numerous acoustic stacks therein, such as several thousand arranged in a 2D array. An exemplary acoustic stack 15 may comprise one or more acoustic stack components, or a plurality of acoustic stack components, which have been laminated. This lamination may comprise an accelerated cure adhesive comprising an epoxy resin, and may further comprise at least one modified epoxy resin as disclosed herein. In an embodiment, the one or more acoustic stack components are all laminated. In another embodiment, some of the acoustic stack components are laminated, while others are not laminated.

The acoustic stack components may comprise various layers and/or components and/or elements, which may be referred to as "acoustic stack components." For example, the acoustic stack may comprise a crystal or ceramic layer 44, and/or a flexible circuit 48. An acoustic stack 15 may further comprise at least one matching layer or a plurality of matching layers, such as an outer-matching layer 40 and an inner-matching layer 42. Although not shown, additional layers may be included in acoustic stack 15, such as one or more dematching layers or additional matching layers, such as matching layers having a particular wavelength. In an embodiment, three or more matching layers may be used. The matching layer can be placed between an active element and a transducer face to provide for optimal impedance matching. Each matching layer can be any conventional matching layer known in the art, which has an acoustical impedance between an active element and at least one additional element, such as a metal or water for example, depending on the type of transducer. The acoustic stack 15 may be used in the production of transducer elements or acoustic elements, which can be used in transducers such as an ultrasound transducer or an acoustic sensor array. Although acoustic stack components are discussed in an order herein, no specific order is intended to limit the scope of this disclosure.

The ceramic layer 44 is configured to generate and transmit acoustic energy into the body or other volume, and receive backscattered acoustic signals from the body or other volume to create and display an image. The ceramic layer 44 may further comprise electrodes (not shown). The ceramic layer 44 can be formed of a variety of materials. In one embodiment, the ceramic layer 44 may be formed from a piezoelectric ceramic, such as lead zirconate titanate (PZT). In other embodiments, the ceramic layer 44 may be formed from a piezocomposite, piezoelectric crystals, a piezoelectric single crystal, a piezopolymer and/or other similar materials. Single-crystal piezoelectric materials may be used such as mon-crystalline lead manganese niobate/lead titanate (PMN/PT) alloys, which may have higher electromechanical coupling and improved sensitivity and bandwidth.

In an embodiment, the ceramic layer 44 is comprised of one layer of one material. In another embodiment, the ceramic layer 44 comprises more than one layer or sublayers formed from one material. In yet another embodiment, the ceramic layer 44 may be comprised of more than one layer or sublayer formed from more than one material. In other words, the ceramic layer 44 may comprise a single layer, multiple sub-layers of the same material, or multiple layers of different materials.

The acoustic stack 15 may further comprise a circuit 50. Circuit 50 may be an integrated circuit, for example, an application specific integrated circuit (ASIC) and/or similar circuit. In an exemplary embodiment, the ceramic layer 44 and the flexible circuit 48 are electrically and mechanically connected to the integrated circuit 50.

The acoustic stack 15 may further include an interposer (not shown). The interposer routes one connection to another using an electrical interface. The interposer may include conductive elements that electrically connect an array of acoustic elements to the integrated circuit. The acoustic stack may also include a high impedance or dematching layer 46. The dematching layer 46 can be any conventional dematching layer known in the art, for example, tungsten carbide. The acoustic stack may further include a backing 52, which can be any conventional backing known in the art.

Figure 3:
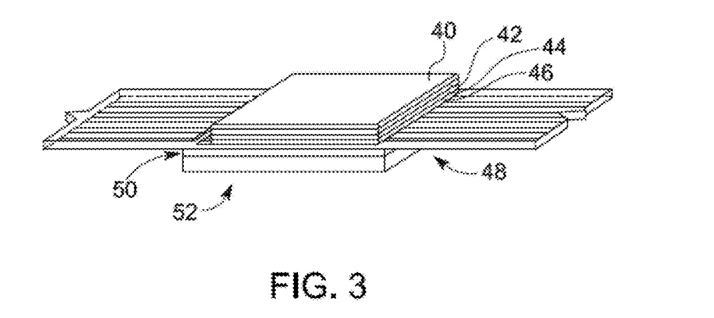
FIG. 3 illustrates an unexploded view of the exemplary acoustic stack shown in FIG. 2.

Referring to FIG. 3, an exemplary unexploded cross-sectional view of an acoustic stack 15 is shown. The previously described acoustic stack 15 components are joined together using an adhesive as described herein.

In an embodiment, the components of the acoustic stack 15 are joined together by laminating, gluing, or adhering the components together. An accelerated cure adhesive may be used when joining the components together, which includes an epoxy resin comprising modified epoxy resins. The modified epoxy resin may be selected from a group of modified epoxy resins consisting of epoxy phenol novolac, bisphenol A, and bisphenol F. In one embodiment, the modified epoxy resin may be epoxy phenol novolac. In a more specific embodiment, the modified epoxy resin may be EPO-TEK® 353ND, available through Epoxy Technology, Inc., Billerica, Mass., USA.

The accelerated cure adhesive may further comprise an epoxy hardener. The epoxy hardener may be selected from a group of epoxy hardeners consisting of imidazole carboxylate, epoxy-imidazole adduct, metal salt-imidazole complex compounds, imidazole acids, and aliphatic polyamines. In an embodiment, the epoxy harder is imidazole carboxylate. In another embodiment, the epoxy hardener is an aliphatic polyamine, wherein the aliphatic polyamine is a chain aliphatic polyamine. In yet another embodiment, the epoxy hardener is an aliphatic polyamine, wherein the aliphatic polyamine is an alicyclic aliphatic polyamine.

The accelerated cure adhesive may further include a filler. The filler may be selected from the group consisting of metallized hollow polymer microspheres, metal spheres, polymer spheres, and graphite flakes. In an embodiment, the filler is comprised of metallized hollow polymer microspheres having a diameter in a range of about 2 to about 25 micrometers.

The accelerated cure adhesive may further include a light and/or UV cure/reactive agent in an embodiment. A light and/or UV cure agent can be any conventional agent known in the art. For example, a light and/or UV cure agent may be selected from the group consisting of onimum salts including diphenyliodonium hexafluorphosphate and triphenylsulfonium hexaflurophosphate.

In order to cure the adhesive, heat is applied to join the acoustic stack components together. The accelerated cure adhesive may be cured at a temperature in a range of about 60° C. to about 250° C. In one embodiment, the accelerated cure adhesive cures in less than 30 minutes. In another embodiment, the accelerated cure adhesive cures in less than 5 minutes. The accelerated cure adhesive, according to another embodiment, cures in less than 5 minutes.

By utilizing embodiments of the accelerated cure adhesive described herein, a 70-90% reduction in cycle time to produce an acoustic or transducer element is achieved as compared to known acoustic sensor array resins. The lower cycle time also results in a shorter period of time where the precision alignment and holding of acoustic stack components is required. In one embodiment, the precision alignment and holding of the acoustic stack components is from about 1 minute to about 2 minutes. In other embodiments, the shorter period of time is 1 minute, 1.5 minutes, or 2 minutes.

In an embodiment, the accelerated cure adhesive has a moisture uptake in a range of about 0% to about 3%. An embodiment of the accelerated cure adhesive has a room temperature viscosity in a range of about 300 CPS to about 35,000 CPS. The die shear strength of embodiments of the accelerated cure adhesive is greater than 50 GF. Furthermore, embodiments of the accelerated cure adhesive have a glass transition temperature in a range of about 25° C. to about 250° C.

Once an acoustic stack is cured or laminated, the acoustic stack may be diced or segmented into acoustic elements or transducer elements. The dicing may be performed using a dicing saw to form isolation cuts, which cut through all layers, such as the matching layers 40, 42, the ceramic layer 44, the flexible circuit 48, and at least part of the backing 52. The dicing provides electrical and acoustic isolation between the independent transducer elements. Depending on the number and orientation of dicing segmentation the elements may form either one or two dimensional array acoustic stacks. These elements may be laminated together or independently to form an acoustic stack.

Embodiments of the accelerated cure adhesive of the present invention substantially decrease the time required for curing an acoustic stack, and therefore, the time required to hold the acoustic stack components in place. As a result, the tooling, fixturing and equipment utilized for the precision alignment and holding of the acoustic stack components during the curing process can be integrated into the equipment, rather than each individual part or group of parts requiring a separate entity, which is required by traditional acoustic stack adhesive processing.

Use of the accelerated cure adhesive of the present invention results in a decrease in failure defects, such as poor capacitance, open joints, loop gain failure, and sensitivity failures. More specifically, the decreased failure defects results from improved mechanical shear strength, electrical connectively, joint stability, and environmental reliability accomplished from the use of the accelerated cure adhesive. Pressing the acoustic stack components results in the low initial viscosity accelerated cure adhesive migrating to each of the bond lines. The accelerated cure adhesives may lock the components into place within 5 to 30 seconds of applying heat. The accelerated cure adhesive allows for a substantial decrease in time to manufacture transducers from approximately 1-3 weeks to approximately 1-3 hours.

Figure 4:
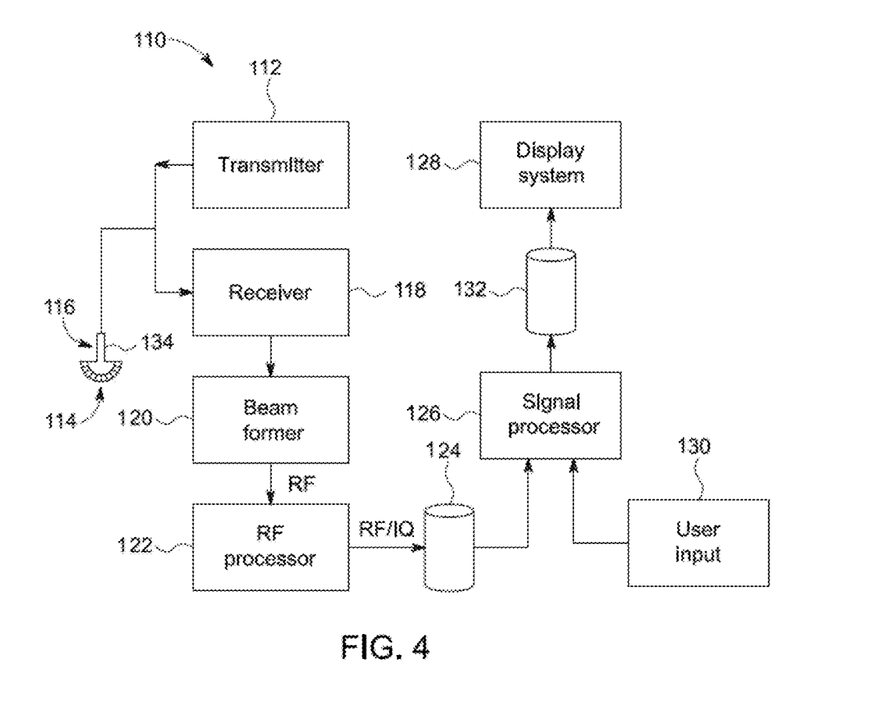
FIG. 4 is a block diagram of an ultrasound system formed in accordance with various embodiments.

The acoustic stack 15 may be used in a system, for example, the system of FIG. 4. Referring to FIG. 4, a block diagram of an ultrasound system 110 is shown, which may be used to acquire and process ultrasound images. The ultrasound system 110 may be embodied in a small-sized system, such as laptop computer or pocket sized system as well as in a larger console-type system.

The ultrasound system 110 includes a transmitter 12 that drives an array of transducer or acoustic elements 114 within or formed as part of an ultrasound transducer 116 to emit pulsed ultrasonic signals into a body or other volume. A variety of geometries may be used to arrange acoustic elements 114. Each acoustic element 114 may have one or more of an outer matching layer, an inner matching layer, a ceramic or crystal layer, a dematching layer, a flexible circuit, a controller, and/or a backing, which are glued together with the accelerated cure adhesive, as described herein.

The ultrasonic signals are back-scattered or received from density interfaces and/or structures in the body or other volume (e.g., blood cells, fatty tissue, and/or muscular tissue in a body) to produce echoes that return to the acoustic elements 114. The echoes are received by a receiver 118. The received echoes are passed through beamforming electronics 120, which perform beamforming and outputs a radio frequency ("RF") signal. The RF signal then may pass through an RF processor 122. The RF processor 122 may include a complex demodulator (not shown) that demodulates the RF signal to form quadrature ("IQ") data pairs representative of the echo signals. The RF or IQ signal data may then be routed directly to a memory 124 for storage (e.g., temporary storage).

The ultrasound system 110 may further include a signal processor 126 to process the acquired ultrasound information (e.g., RF signal data or IQ data pairs) and prepare frames of ultrasound information for display on a display system 128. The signal processor 126 is adapted to perform one or more processing operations according to a plurality of selectable ultrasound modalities on the acquired ultrasound information. Acquired ultrasound information may be processed and/or displayed in real-time during a scanning session as the echo signals are received. Additionally or alternatively, the ultrasound information may be stored temporarily in the memory 124 during a scanning session and then processed and/or displayed in less than real-time in a live or off-line operation.

The signal processor 126 may be connected to a user input device 130 that may control operation of the ultrasound system 110. The user input device 130 can be any suitable device and/or user interface for receiving user inputs to control, for example, the type of scan or type of transducer to be used in a scan. The ultrasound system 110 may include a memory 132 for storing processed frames of acquired ultrasound information that are not scheduled to be displayed immediately. One or both of the memory 124 and the memory 132 may store three-dimensional (3D) data sets of the ultrasound data, where such 3D datasets are accessed to present 2D and/or 3D images. Multiple consecutive 3D datasets may also be acquired and stored over time, such as to provide real-time 3D or 4D display.

In addition to the acoustic elements 114, various other components of the ultrasound system 110 may be considered to be a component of the ultrasound transducer 116. For example, the transmitter 112, the receiver 118, and/or the beamforming electronics 120 may each be a component of the ultrasound transducer 116. In some embodiments, two or more components of the ultrasound system 110 are integrated into an integrated circuit (e.g., the integrated circuit 36 shown in FIGS. 2 and 3), which may be a component of the ultrasound transducer 116.

The ultrasound system 110 may include an ultrasound probe 134 that holds one or more various components of the ultrasound transducer 116. For example, as shown in FIG. 4, the ultrasound probe 134 holds the array of acoustic elements 114. In addition to the acoustic elements 114, and for example, the ultrasound probe 134 may hold the transmitter 112, the receiver 118, the beamforming electronics 120, and/or one or more integrated circuits that include any a transmitter 112, a receiver 118, and/or beamforming electronics 120.

As discussed above, the integrated circuit 50 may be any type of integrated circuit, for example, an application specific integrated circuit (ASIC), which facilitates performing the operations and functions of the various components of the integrated circuit 50. Various components of the ultrasound system 110 of FIG. 4 may be included within the integrated circuit 50. In an exemplary embodiment, the integrated circuit 50 includes the transmitter 112, the receiver 118, and the beamforming electronics 120 of the ultrasound system 110. The electrical contacts of the integrated circuit 50 are configured to be electrically connected to corresponding electrical contacts of the flexible circuit 48 to establish an electrical connection between the integrated circuit 50 and the flexible circuit 48.

Figure 5:
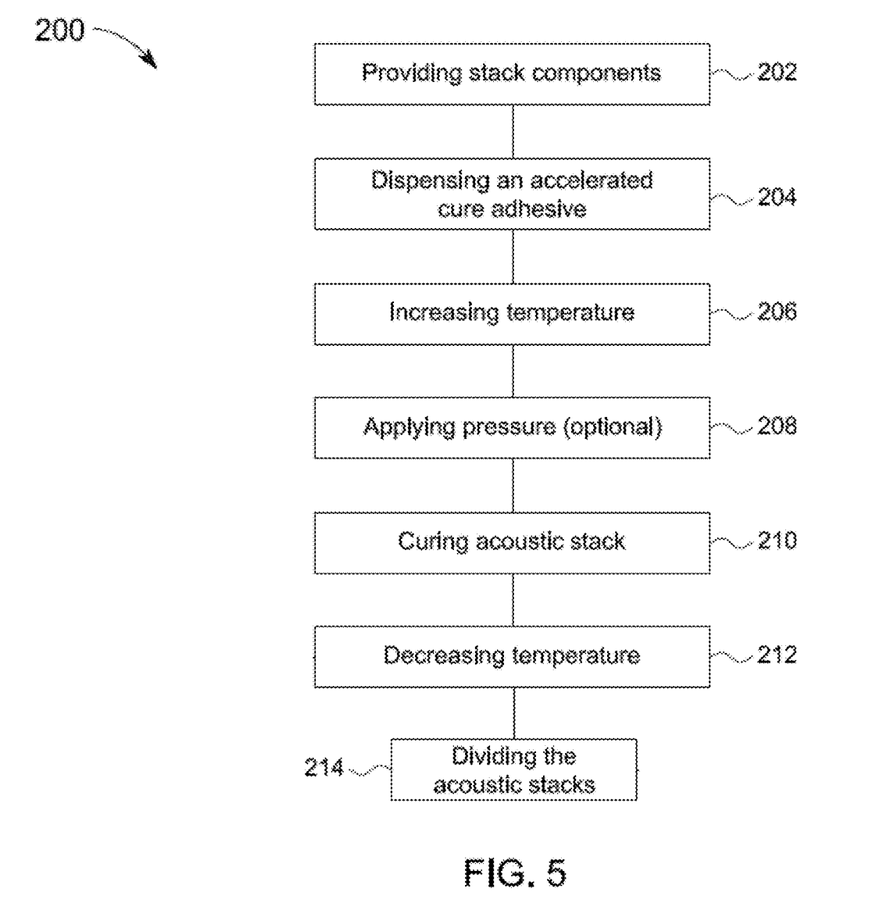
FIG. 5 is a flowchart illustrating a method for manufacturing an ultrasound transducer in accordance with various embodiments.

FIG. 5 is a flowchart illustrating a method 200 for manufacturing a transducer in accordance with various embodiments. Exemplary uses of the method 200 include manufacturing an acoustic stack 15, as shown in FIGS. 2 and 3, and an ultrasound transducer 116, as shown in FIG. 4. The method includes providing acoustic stack components 202, and dispensing an accelerated cure adhesive to the acoustic stack components 204. As discussed above, the acoustic stack components may be selected from the outer-matching layer 40, the inner-matching layer 42, the ceramic or crystal layer 44, the dematching layer 46, the flexible circuit 48, the integrated circuit 50, and the backing 52. The accelerated cure adhesive includes an epoxy that includes at least one modified epoxy resin. The accelerated cure adhesive may further comprise an epoxy hardener, light reactive agents, UV reactive agents, and/or fillers.

In another embodiment, the method may further include increasing the temperature 206. The increased temperature causes the low viscosity accelerated cure adhesive to flow. As a result, the accelerated cure adhesive may spread from the gaps between acoustic stack interfaces. In an embodiment, pressure is applied to the acoustic stack and accelerated cure adhesive 208, which traps the resin and/or particles within the acoustic stack. Pressure can be applied by any conventional means known in the art. For example, load may be applied to the acoustic stack by a bond head (pneumatic or servo driven) and the pressure may be in a range from about 1N to about 1000N.

The method may further include curing the accelerated cure adhesive 210. Curing the accelerated cure adhesive 210 may be performed by at least one of the following curing methods: thermal curing methods, UV curing methods, and microwave curing methods.

The method may further include decreasing the temperature when the accelerated cure adhesive has substantially cured 212. For example, the temperature may be decreased when the accelerated cure adhesive of the acoustic stack has achieved approximately a 90% to 100% cure. For example, the temperature may be decreased when the accelerated cure adhesive has achieved a 90% cure, a 95% cure, a 98% cure, or a 100% cure. When the temperature decreases the gaps between acoustic stack components decreases as a result of curing shrinkage forces.

The method may further comprise dividing, that is dicing or segmenting, the substantially cured acoustic stack 214 into a plurality of individual acoustic or transducer elements, or into two or more separate groups of acoustic elements. These elements can be utilized by any means known in the art, for example, as shown in FIG. 4.

EXAMPLES

EPO-TEK® 353ND was analyzed via differential scanning calorimetry to measure the heat change that occurs in a material when exposed to different temperature conditions. This information allows for one to understand the reactions taking place in the examined material, including the cure state, thermal behavior, and thermal stability. A time sweep was performed on cured material at constant temperature to determine the percent cure. The accelerated cure adhesive containing 353ND was able to achieve greater than about 95% cure within 5 minutes.

Figure 6:
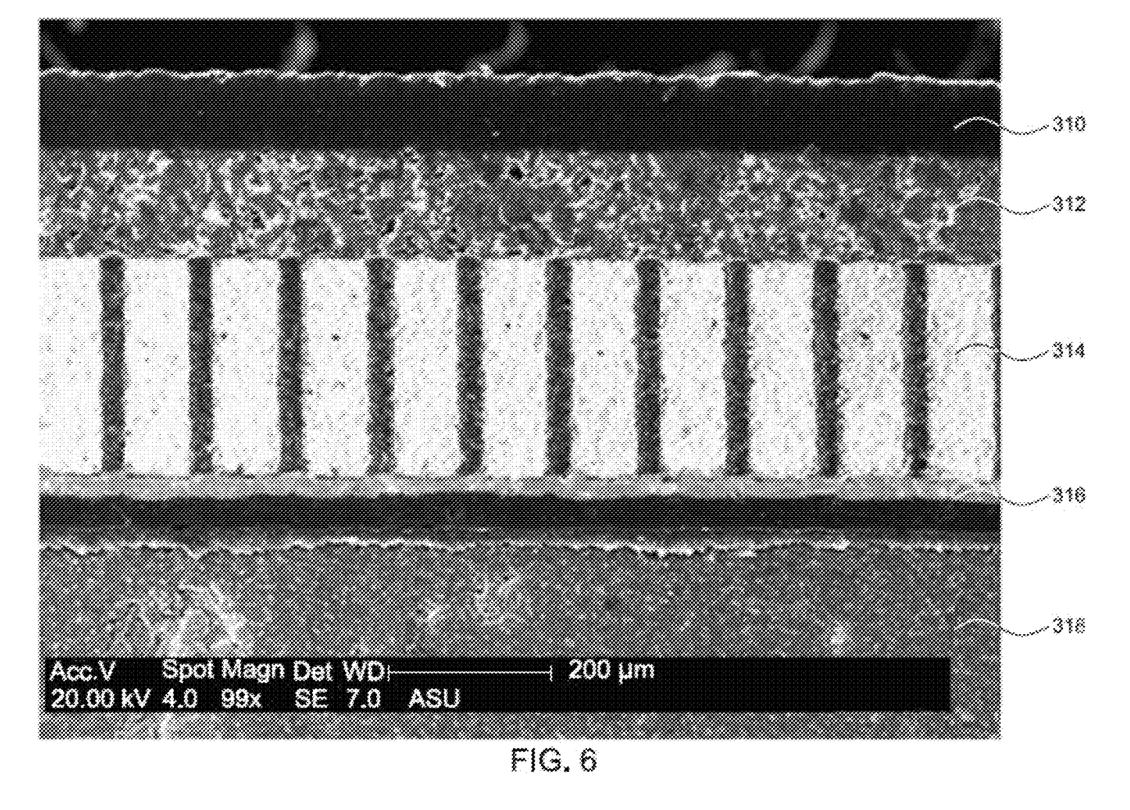
FIG. 6 is a scanning electron micrograph of an acoustic sensor array at a magnification of 99×.
Figure 7:
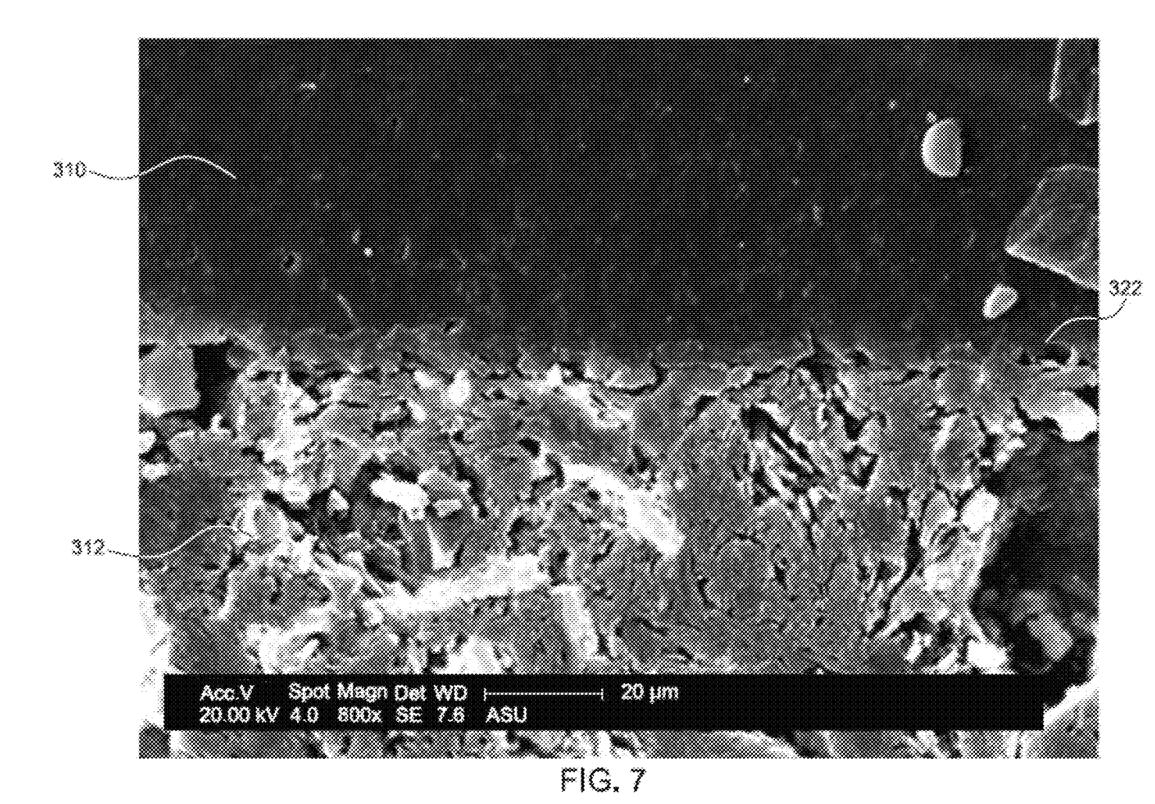
FIG. 7 is a scanning electron micrograph of an acoustic sensor array at a magnification of 800×.

The bondlines were evaluated using scanning electron microscopy (SEM). FIG. 6 is a scanning electron micrograph of an acoustic sensor array produced with the accelerated cure adhesive according to an embodiment of the invention at a magnification of 99×. In particular, the accelerated cure adhesive included EPO-TEK® 353ND. A first or outer matching layer is shown at 310, a second or inner matching layer is shown at 312, a composite cut ceramic layer is shown at 314, a flexible circuit is shown at 316, and a backing block is shown at 318. The first matching layer may be antimony graphite, the second matching layer may be acrylonitrile butadiene styrene polymer ("ABS"), and the ceramic layer may be gold coated. As can be seen in FIG. 7, shown at 800× magnification, the first matching layer 310, which includes antimony graphite, and the second matching layer 312, which includes ABS, have a bond line or bond lines 322 of less than 1 micrometer. The first matching layer 310 and ceramic layer 314 PZT bond line of FIG. 8 shows a variable bond line at 1500× magnification. In particular, the gold coating is located between the white lines, 318 and 320 which have been added to the micrograph for illustrative purposes. Line 318 represents the surface of the first matching layer 310 and line 320 represents the gold coating.

The resulting acoustic stack of embodiments of the present invention has increased shear strength, electrical connectivity, acoustic properties, and environmental reliability.

It should be noted that although the various embodiments may be described in connection with an ultrasound system, the methods and systems are not limited to ultrasound imaging or a particular configuration thereof. The various embodiments may be implemented in connection with different types of imaging systems, including, for example, multi-modality imaging systems having an ultrasound imaging system and one of an x-ray imaging system, magnetic resonance imaging (MRI) system, computed-tomography (CT) imaging system, positron emission tomography (PET) imaging system, among others. Various embodiments may be implemented in non-medical imaging systems, for example, non-destructive testing systems such as ultrasound weld testing systems or airport baggage scanning systems. Further, embodiments are not limited to ultrasound transducers, but may include transducers used in other imaging modalities, including, but not limited to, industrial non-destructive evaluation and sensing.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet, a microprocessor, a communication bus, a memory and/or storage device. As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements in the form of an information source or physical memory, in order to process input and/or store data or other information as desired or needed.

To the extent that the figures illustrate diagrams of the functional blocks of various embodiments, the functional blocks are not necessarily indicative of the division between hardware circuitry or programs. Thus, for example, one or more of the functional blocks (e.g., processors or memories) may be implemented in a single piece of hardware (e.g., a general purpose signal processor or a block of random access memory, hard disk, or the like) or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "including", "comprising" or "having" an element, or a plurality of elements having a particular property, may include additional elements that may or may not share the same properties.

It is to be understood that the above description is intended to be illustrative, and not restrictive. Modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An acoustic stack comprising:
   a plurality of acoustic stack components laminated with an accelerated cure adhesive comprising an epoxy resin,
   wherein the epoxy resin includes one or more modified epoxy resins selected from a group consisting of epoxy phenol novolac, bisphenol A, and bisphenol F.

2. The acoustic stack of claim 1, wherein the accelerated cure adhesive has a moisture uptake in a range of about 0% to about 3%.

3. The acoustic stack of claim 2, wherein the accelerated cure adhesive has a room temperature viscosity in a range of about 300 CPS to about 35,000 CPS.

4. The acoustic stack of claim 3, wherein the accelerated cure adhesive has a die shear strength of greater than 50 GF.

5. The acoustic stack of claim 4, wherein the accelerated cure adhesive has a glass transition temperature in a range of about 25° C. to about 250° C.

6. The acoustic stack of claim 1, wherein the acoustic stack components comprise:
   at least one matching layer;
   a ceramic layer; and
   a flexible circuit.

7. The acoustic stack of claim 6, wherein the acoustic stack components further comprise:
at least one of (i) an interposer, (ii) a dematching layer, (iii) an integrated circuit, (iv), an interposer, and/or (v) a backing, or any combination thereof.

8. The acoustic element of claim 1, further comprising:
at least one epoxy hardener.

9. The acoustic stack of claim 8, wherein the at least one epoxy hardener is selected from the group consisting of: imidazole carboxylate, epoxy-imidazole adduct, metal salt-imidazole complex compounds, imidazole acids, and an aliphatic polyamine.

10. The acoustic element of claim 8, further comprising:
at least one of a filler, a light curing agent, and/or a UV curing agent.

11. The acoustic stack of claim 10, wherein the filler is selected from the group consisting of metallized hollow polymer microspheres, metal spheres, polymer spheres, and/or graphite flakes.

12. A method for producing an acoustic stack, the method comprising:
providing a plurality of acoustic stack components;
dispensing an accelerated cure adhesive to the acoustic stack components, wherein the accelerated cure adhesive comprises an epoxy resin that includes at least one modified epoxy resin selected from a group consisting of epoxy phenol novolac, bisphenol A, and bisphenol F; and
curing the accelerated cure adhesive.

13. The method of claim 12, further comprising increasing the temperature of the acoustic stack components and the dispensed accelerated cure adhesive.

14. The method of claim 13, further comprising spreading the accelerated cure adhesive between interfaces of the acoustic stack components.

15. The method of claim 13, further comprising applying pressure to the acoustic stack components and the accelerated cure adhesive.

16. The method of claim 12, wherein the accelerated cure adhesive has a moisture uptake in a range of about 0% to about 3%, a room temperature viscosity in a range of about 300 CPS to about 35,000 CPS, a die shear strength of greater than 50 GF, and a glass transition temperature in a range of about 25° C. to about 250° C.

17. The method of claim 12, wherein curing the accelerated cure adhesive takes place at a temperature from about 60° C. to about 250° C.

18. The method of claim 12, wherein the time to cure the accelerated cure adhesive is less than 60 minutes.

19. The method of claim 12, wherein 80% or more of the accelerated cure adhesive is cured within about 15 seconds to about 60 minutes.

20. The method of claim 12, wherein the step of curing the accelerated cure adhesive is for a time of 5 minutes or less.

* * * * *